Figure 1:
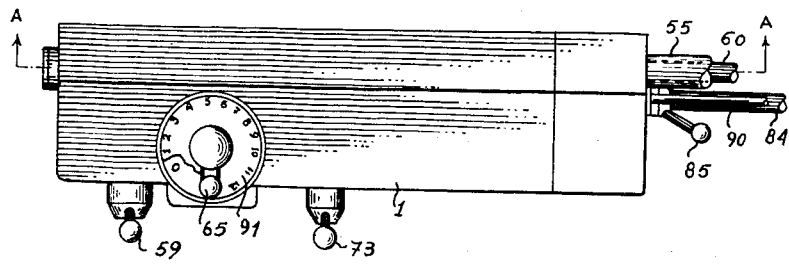

Jan. 22, 1957

G. ROMI 2,778,237

GEAR CASE, SUITABLE FOR LATHES OR MACHINE
TOOLS OR MACHINES IN GENERAL

Filed Jan. 18, 1954

5 Sheets-Sheet 1

INVENTOR.
GIORDANO ROMI
BY

INVENTOR.
GIORDANO ROMI

Jan. 22, 1957 G. ROMI 2,778,237
GEAR CASE, SUITABLE FOR LATHES OR MACHINE
TOOLS OR MACHINES IN GENERAL
Filed Jan. 18, 1954 5 Sheets-Sheet 3

INVENTOR.
GIORDANO ROMI
BY

Jan. 22, 1957    G. ROMI    2,778,237
GEAR CASE, SUITABLE FOR LATHES OR MACHINE
TOOLS OR MACHINES IN GENERAL
Filed Jan. 18, 1954    5 Sheets-Sheet 4
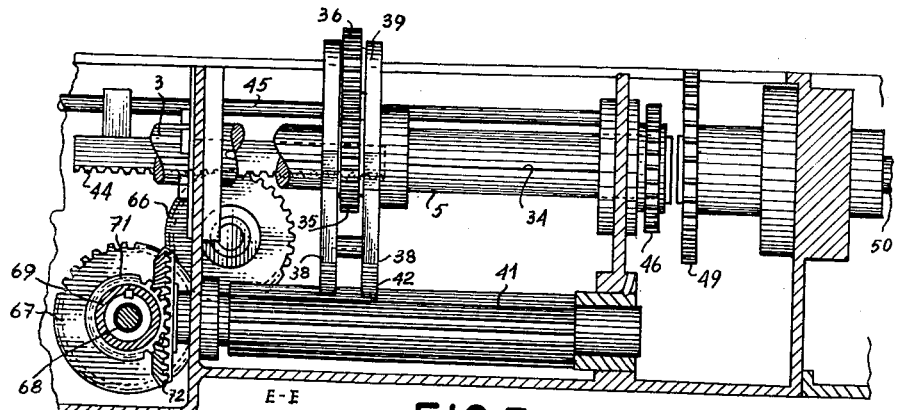
FIG. 7
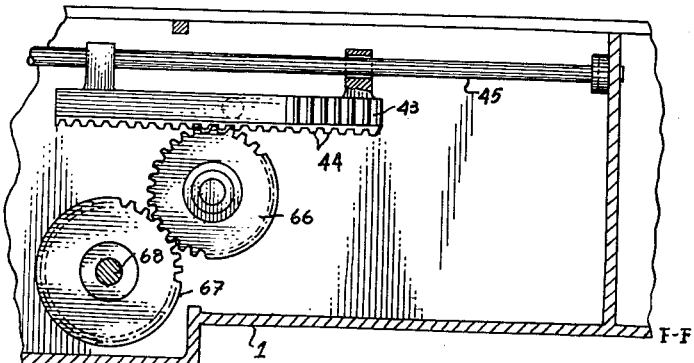
FIG. 8
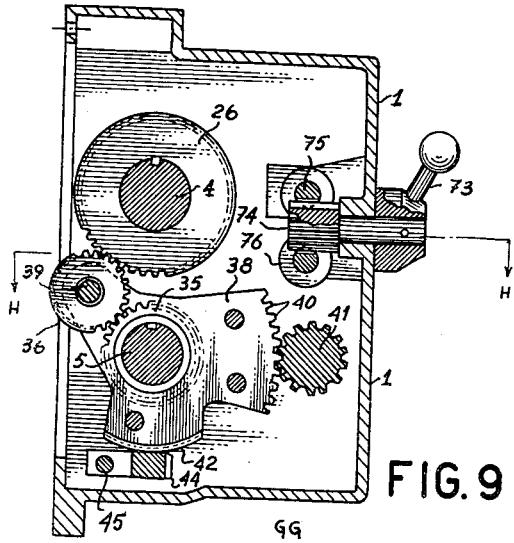
FIG. 9
INVENTOR.
GIORDANO ROMI
BY

Jan. 22, 1957

G. ROMI 2,778,237

GEAR CASE, SUITABLE FOR LATHES OR MACHINE
TOOLS OR MACHINES IN GENERAL

Filed Jan. 18, 1954

5 Sheets-Sheet 5

INVENTOR.
GIORDANO ROMI
BY

United States Patent Office 2,778,237
Patented Jan. 22, 1957

2,778,237

GEAR CASE, SUITABLE FOR LATHES OR MACHINE TOOLS OR MACHINES IN GENERAL

Giordano Romi, Santa Barbara d'Oeste, Brazil, assignor to Maquinas Agricolas "Romi" Limitada, Santa Barbara d'Oeste, Brazil, a Brazilian firm Application January 18, 1954, Serial No. 404,472

Claims priority, application Brazil January 21, 1953

13 Claims. (Cl. 74—333)

The object of the present invention is a new gear case, suitable for machine tools and machines in general, presenting exclusive and unique characteristics, not existing in the presently used gear cases; the case in question presents the fundamental advantage of permitting the realization of all types of threads used nowadays (metric threads, Whitworth threads, modulus threads and diametral pitch threads), without exchanging any gear wheel, simply by moving levers.

With the aid of the case in question, always different threads may be obtained, which means threads without any repetition, which is effected by means of a standard lead screw and an assembly of gear wheels with high-precision transmission ratios.

This precision, unknown up to date in normal cases, is possible due to the fact that the new case in question is provided with a device driven in accordance with a dial, in order to effect the automatic change in the oscillating clutch body, which may engage alternately with the gear wheels of a graduated assembly, said clutch being designed upon entirely new principles.

The new gear case will permit the elimination and substitution of the antiquated and obsolete Norton cases, or quick change gear boxes, as well as of all other cases of threads and feeds, with really noteworthy technical and economic advantages.

The gear case forming the object of the present invention, although constituted by a relatively small number of pieces, permits to execute a total of 384 changes corresponding to 384 different threads, namely 96 Whitworth threads, 96 metric threads, 96 diametral pitch threads and 96 modulus threads. The total number of gear wheels in the new case, which effect the power transmission for obtaining the threads, amounts only to 31, whereas in a Norton case or in a common quick change case 31 gear wheels would not allow to make more than one fourth of the aformentioned number of threads.

The reason for having succeeded in obtaining such a large number of threads with the new gear case, consisting of a small number of power transmission elements, is linked to the fact that it was possible to realize mathematically the conversion of inch units to millimeter units, and then to modulus and finally to diametral pitch, employing essentially always the same gear wheels, whereas in the current systems this operation is effected by substitution of the gear wheels in the part provided for this purpose, or by partially moving levers and changing gear wheels.

According to the invention, the new case permits the automatic synchronization of angular movements and axial displacement movements, whereby the automatic positioning of the body of this clutch in several positions is achieved, which on their turn, when combined with positions of other levers, make possible amongst other things, that the case is completely closed and its elements rotate in oil bath.

However, as in practice the start of a change of position requires the dissynchronization of these movements, making the angular movement momentarily independent of the axial movement, it appeared necessary to include a control dial capable of turning also this operation automatic, with the greatest possible simplicity.

After having tried several possibilities, the problem of this dissynchronization was solved in an elegant and simple manner. Only one control lever executes the operation of dissynchronization, permitting initially the disconnection of the power transmission gears from the clutch, and then effecting the re-synchronization and progressively the change-over of this clutch from any one position to another one, this being a helical movement due to the fact that it is the result of the synchronized action of two movements (angular and axial); once the desired position is reached, the momentary dissynchronization occurs again, as well as the angular movement, this time in order to effect the clutching and then to re-synchronize the movements and to positively locate the lever in the required position.

As will be seen later, it is a very important condition that the angular displacements take different values for each of the different positions. As the angular displacements of the clutch in the moment, when same passes from one position to another one, are synchronized with the axial displacement, and because same is obtained by an element of constant pitch, it became necessary to proportionally vary the width of the gear wheels and to proceed, in the whole, to positive and negative corrections of the diameters of these gears, in order to compensate for the angular displacements.

The method of transfer of one thread system to several others, employing for instance a standard lead screw in inches, is the following: the first assembly of gear wheels, through which power is transmitted from the headstock to the new case, permits two different positions, obtaining a 1 to 1 ratio in one position, and a submultiple value of $\pi$ (p) in the other position.

By means of the 1 to 1 ratio and a special combination, in existence on the new gear box, the metric threads and the Whitworth threads are made; with the aid of the sub-multiple ratio of $\pi$ (pi) in combination with other ratios, which will be explained later, the modulus and diametral pitch threads are obtained. By means of a lever which may assume two different positions, the main gear of the assembly may at one time be driven and at another time be driver.

When the main gear wheel acts as driver member, Whitworth threads and diametral pitch threads will be obtained in relation to the two positions of the aforementioned lever, namely when said lever is in the position 1 to 1, respectively sub-multiple of $\pi$ (pi).

When the main gear wheel acts as driven member, metric threads and modulus threads will be obtained in connection with the two positions of the aforementioned lever, namely when said lever goes into the position 1 to 1, respectively sub-multiple of $\pi$ (pi).

Figure 2:
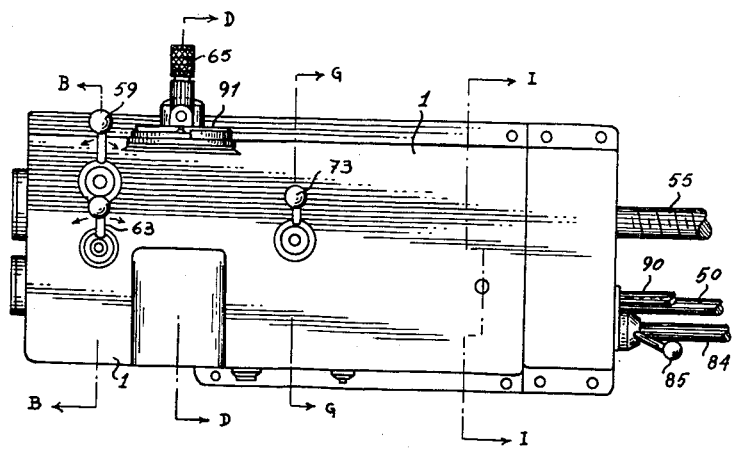
Figure 3:
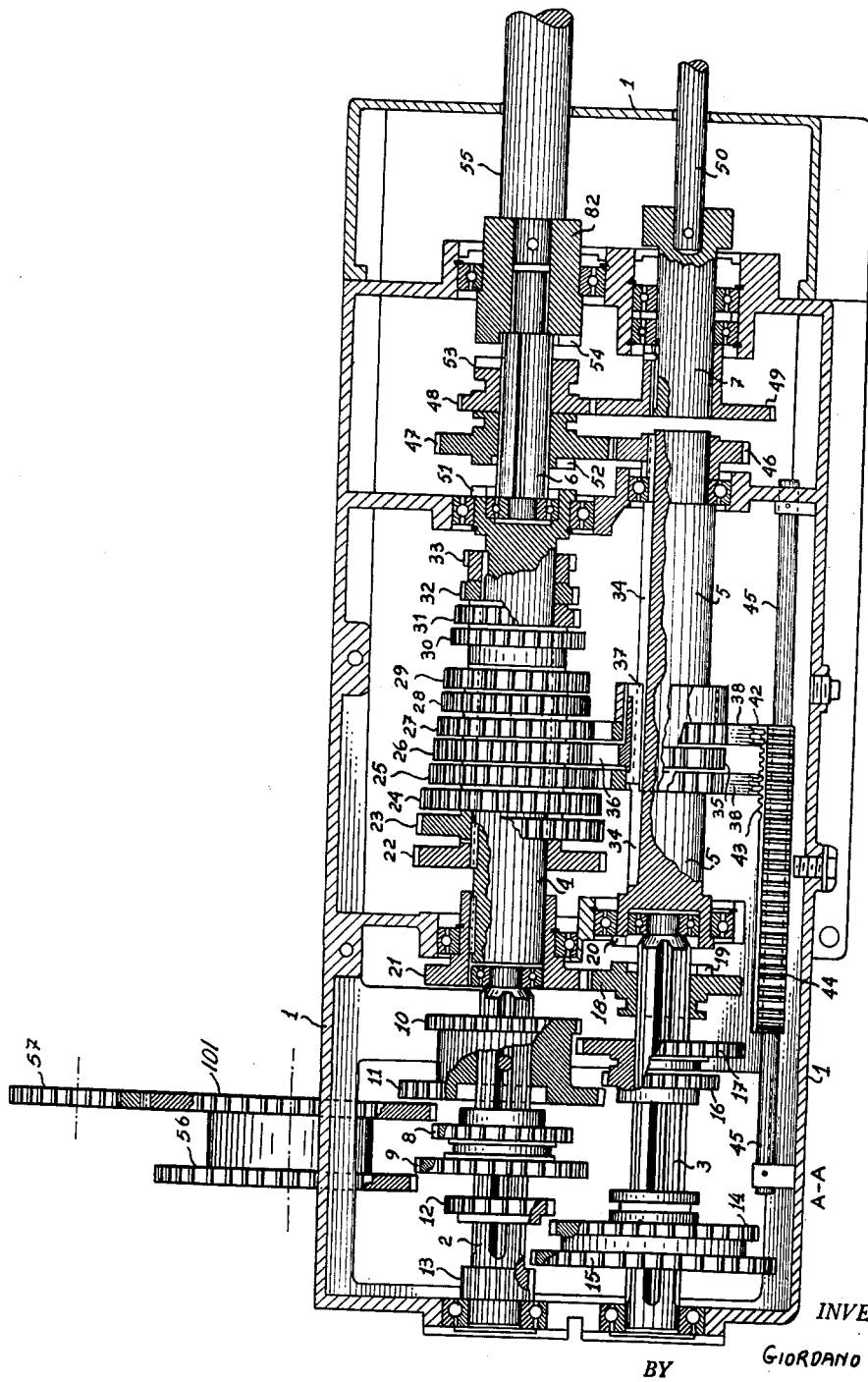
Figure 4:
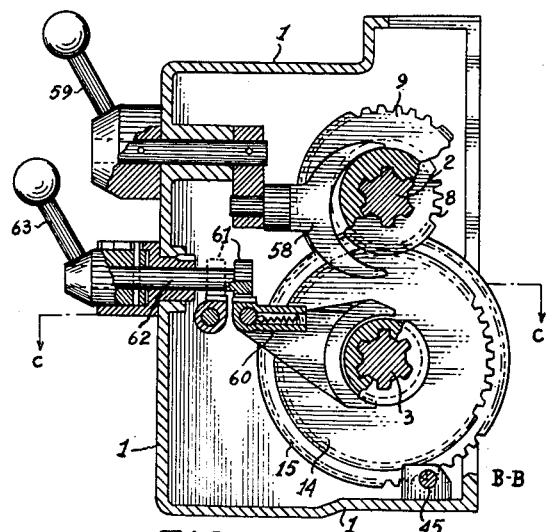
Figure 5:
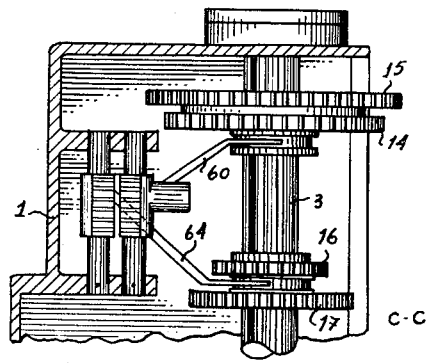
Figure 6:
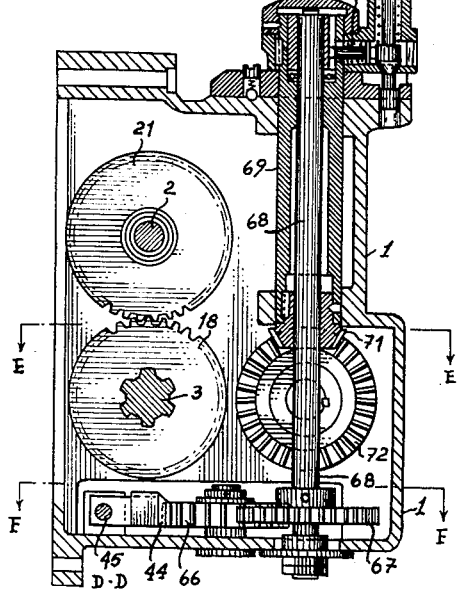
Figure 10:
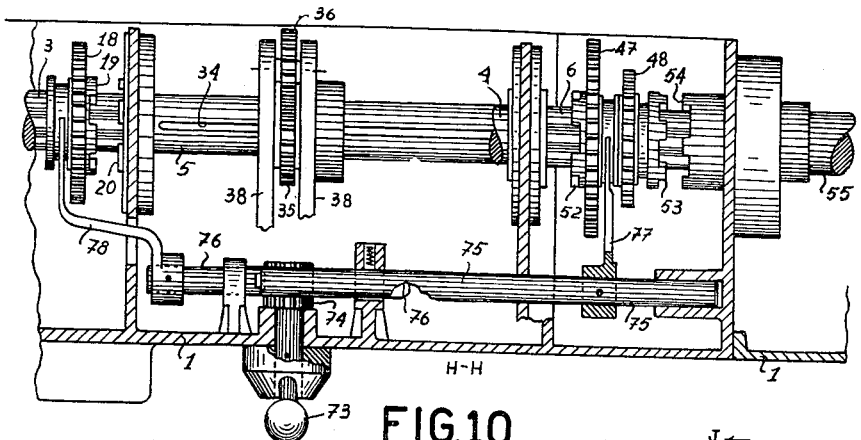
Figure 13:
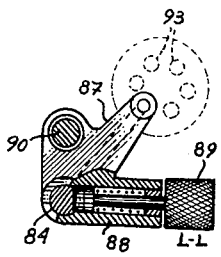
Figure 11:
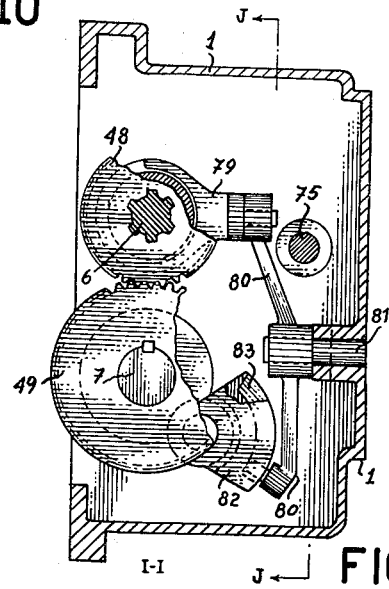
Figure 12:
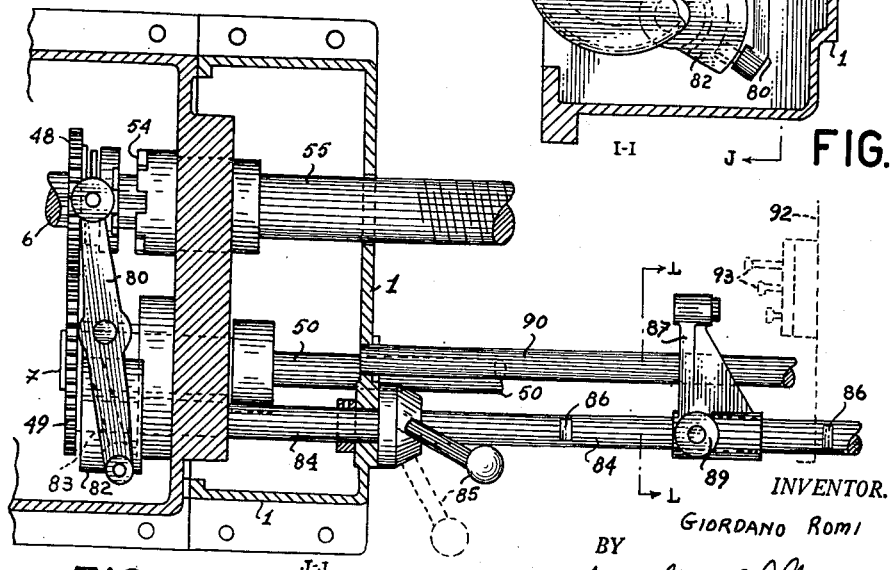

The attached drawings will better explain the invention, merely as a non-restrictive example, which represent:

Fig. 1, a top view of the gear case,
Fig. 2, a front view of the case,
Fig. 3, section A—A of Fig. 1,
Fig. 4, section B—B of Fig. 2,
Fig. 5, section C—C of Fig. 4,
Fig. 6, section D—D of Fig. 2,
Fig. 7, section E—E of Fig. 6,
Fig. 8, section F—F of Fig. 6,
Fig. 9, section G—G of Fig. 2,
Fig. 10, section H—H of Fig. 9,
Fig. 11, section I—I of Fig. 2,
Fig. 12, section J—J of Fig. 11,
Fig. 13, section L—L of Fig. 12.

The gear case in question consists of a housing 1 suitably fixed to the machine, and in whose interior are disposed the gear wheels which form the several gears of the assembly.

The working gears are mounted on their respective shafts 2, 3, 4, 5, 6 and 7, disposed in two longitudinal rows of three shafts each, said rows being arranged in the same vertical plane.

Shaft 2 is splined in order to permit the longitudinal displacement of gear wheels 8 and 9 of different diameters, connected to each other; on the same shaft, to the right of the displaceable gear wheels, are mounted the gear wheels 10 and 11, whereas on the left side are mounted the gear wheels 12 and 13. Wheels 10, 11, 12 and 13 are fixed on shaft 2.

Shaft 3, also splined, presents the displaceable gear wheels 14 and 15, connected to each other, which may engage alternatively wheels 12 and 13 of shaft 2; said shaft 3 is further provided with the displaceable gear wheels 16 and 17, connected to each other, which may engage with wheels 10 and 11 of shaft 2. Finally, said shaft 3 supports the displaceable gear wheel 18 provided with protuberances and recesses 19 on its lateral face, in correspondence to the facial recesses and protuberances 20 provided at the end of shaft 5. Furthermore, gear wheel 18 may engage with gear wheel 21 keyed to the end of shaft 4.

Said shaft supports, furthermore, gear wheels 22 up to 33 of successively diminishing diameter from the left to the right; said wheels, keyed and fixed on shaft 4, are suitably spaced, in accordance with the reason exposed in the introduction of these specifications.

A longitudinal groove 34 is provided on shaft 5 over almost its entire length; on this shaft is placed gear wheel 35 which may engage with any one of the gear wheels 22 to 33, by means of the intermediate gear wheel 36. Gear wheel 35 is provided with key 37 fitted in groove 34, said wheel being provided on each side with plates 38 of irregular shape, between which a short shaft 39 is fixed, which supports the cited gear wheel 36.

The plates 38 present a toothed portion 40 in form of an arc of a circle, for engagement with the toothed control shaft 41, the purpose of which will be seen later; said plates are, furthermore, provided with a lower portion 42, toothed transversely to the shafts and engaged with the upper toothed portion 43 of a rack 44 which may slide along the fixed shaft 45.

Furthermore, a gear wheel 46 is keyed to the right end of shaft 5.

Shaft 6, also splined, supports two displaceable gear wheels 47 and 48, the first of which may engage with gear wheel 46 of shaft 5, whereas the second may engage with gear wheel 49 provided at the inner end of shaft 7, to the outer end of which is connected the feed rod 50.

Shaft 4 presents at its right end protuberances and recesses 51 in correspondence to the protuberances and recesses 52 of gear wheel 47.

On the other hand gear wheel 48 is provided with protuberances and recesses 53 corresponding to the protuberances and recesses 54 of the tubular joint 82, to which is connected the main shaft 55 also called lead screw.

The gear wheels 8 and 9 may be alternatively coupled to wheels 56 or 101 which are fixedly connected to each other, the latter gear wheel engaging gear 57 which is suitably connected to the power take-off of the headstock.

Thus, gears 8 and 9 are connected together, are displaceable on shaft 2, and can ultimately drive gears 56 and 101. When gear 9 is coupled to gear 56, the latter rotates together with gear 101, and this in turn drives gear 57.

Gear wheels 8 and 9 may be displaced together along shaft 2 by means of a fork 58 controlled by the external lever 59.

The unit of gear wheels 14—15 may slide on shaft 3 by means of fork 60, controlled by the small gear wheel 61 provided at the inner end of shaft 62, to which is fixed lever 63; the unit of gear wheels 16—17 is also displaceable along shaft 3 by means of fork 64, moved equally by the small gear wheel 61, the shaft 62 which for this double function can be displaced axially.

At the outside of the case, a lever 65 is provided which controls the coupling and un-coupling movements between gear wheel 36 and the wheels 22 to 33. For this purpose, rack 44 is subsequently coupled to gear wheels 66 and 67, the latter one being mounted on the lower part of shaft 68, which goes through the axially bored shaft 69, in upper connection with lever 65; by means of a pin 70, this lever may connect or disconnect the movement of shaft 68. Shaft 69 is provided in its lower part with a bevel pinion 71 coupled to a bevel gear wheel 72, which is mounted at one end of shaft 41, which is connected to the toothed portion 40 of the above described plates 38.

The displacement of the gear wheels 18 and 47 is effected simultaneously by means of an external lever 73, which is provided internally with a pinion 74 in connection with the toothed portions of two rods 75 and 76 supporting forks 77 and 78, which are connected to gear wheels 47, 18 respectively.

Finally, gear wheel 48 is slid along shaft 6 by means of fork 79 connected to arm 80, which is pivoted centrally in pin 81, fixed to the inner face of case in suitable position.

The movement of arm 80 is effected by means of a cylindrical sector 82 provided with a groove 83 (cam), on its side face, into which engages a projecting pin at the lower end of arm 80; sector 82 is mounted at the end of a shaft 84 controlled by an external lever 85, through which passes said shaft.

Shaft 84 is provided at intervals with recesses 86 for the location of the projecting stop rest 87, provided with pin 88, whose rod is involved by a spring and which is controlled by an external handle 89. Feed rod 90 passes through stop rest 87.

For better understanding of the operation of the case under question, the two typical cases of general positioning of the gear wheels will be described thereunder, one of which providing Whitworth and diametral pitch threads, and the other one modulus and metric threads, all this without need of substitution, addition or withdrawal of gears.

To illustrate the first case (Whitworth and diametral pitch threads), let us assume that lever 73 is in its extreme left position; gear wheel 18 will then be coupled to shaft 5 by means of the recesses and protuberances 19 and 20, the same occurring with gear wheel 47 coupled to shaft 4 by means of recesses and protuberances 51 and 52.

In order to put the gear case into operation, one of gear wheels 8 or 9 is coupled to 56 or 57, according to a table supplied with the machine; power will then be transmitted from the headstock to shaft 2. This shaft will supply rotation to shaft 3 by means of the units 14—15 or 16—17, coupled to gear wheels 10 or 11, and 12 or 13.

By means of the described coupling 19—20, the movement of shaft 3 is transmitted to shaft 5, which in this case is the driving shaft.

The power transmission from shaft 5 to shaft 4 (driven) is obtained by means of the intermediate gear wheel 36, coupled to gear 35, engaged to anyone of the gears 22 to 33. The choice of the gear wheel of the group 22 to 33 is effected in accordance to the requirements of each case, according to a table supplied with the machine, and is accomplished in the following way: assuming the gear wheels of this part of the gear case to be coupled as illustrated in Figs. 3, 6, 7, 8 and 9, gear 36 will then be connected to wheel 26 of shaft 4, whereas the toothed portion 40 of plates 38 is coupled to the longitudinally toothed shaft 41.

If coupling of the intermediate gear wheel 36 with any one of the gear wheels 22 to 33 of shaft 4 is required, it is first necessary to separate wheel 36 from wheel 26; for this purpose, lever 65 is moved upwards.

Due to this movement shaft 68 becomes free, because the connecting element 70, driven by its spring, withdraws into a recess provided in the rod of lever 65, permitting to execute a movement in small circle arc of shaft 69 limited by stops corresponding to the ends of the toothed portion 40 of plates 38, through bevel gears 71, 72 and toothed shaft 41. At this stage, gear wheel 36 is already separated from gear wheel 26.

When it is desired to couple gear wheel 36 to one of the gear wheels 22 to 33, lever 65 is returned partially to its original position, where it fits into a secondary seat.

Any circular movement of lever 65 will cause the movement of shafts 68 and 69 together, the rotation of the first being transmitted to gear wheels 67, 66 and rack 44, which will displace the unit of the plates 38 and wheels 35 and 36 in longitudinal axial sense along shaft 5; at the same time, due to the bored shaft 69, plates 38 are also moving, permitting the distance between wheel 36 and any one of wheels 22 to 33, when imagined as a sequence of points, to form a helicoidal line.

As soon as lever 65 comes to the desired position, marked on dial 91 in accordance with a previously established reference, the cited lever must be lifted in order to disconnect shaft 68, with consequent stop of the axial displacement of the slidable unit and return to its initial position, in small arc of a circle, now permitting to couple gear wheel 36 to the chosen gear wheel among 22 to 33.

The driven shaft 4 will now transmit power to shaft 6 by means of coupling 51—52.

At this moment the machine is ready for operation, to turn shaft 7 or tubular joint 82, chosen by means of lever 85, which moves gear wheel 48. The rotation will then be transmitted to one of shafts 50 or 55 of the slide rest of the machine.

Let us assume now that modulus or metric threads shall be cut; in this case, lever 73 will be in its extreme right position, and therefore wheel 18 and shaft 5 as well as wheel 47 and shaft 4 will be disconnected.

Shaft 3 then transmits power to shaft 4 by means of gear wheels 18 and 21, whereby said shaft 4 becomes the driving shaft for shaft 5 which in this case is driven, by means of one of the gear wheels 22 to 33, adjusted according to a table attached to the machine and in accordance with what has been described for the case above.

The rotation of shaft 5 is transmitted to shaft 6 by means of gear wheels 46 and 47; the choice of the movement of shaft 50 or shaft 55 is effected by means of lever 85 which controls gear wheel 48, locating it in the desired position.

The slide rest 92 is provided at one side with adjustable screws 93 which may contact the stop 87, in order to locate the stop position of said slide rest; when the slide rest is driven by shaft 55, the position of shaft 84 will be such that pin 88 of stop 87 will be out of its seat 86, permitting the free displacement of the cited stop under the action of the adjustable screw 93.

Thus, the described gear case is universal, because any type of known thread may be executed without need of whatever kind of change of the gear case, just by simply operating levers.

Due to the fact that opening said gear case for control or substitution of parts is unnecessary, all moving members will be operating in an oil bath.

It is evident that the assembly may be changed with regard to minor constructive details, such as increasing the number of control levers in certain cases, varying the dimensions of the several parts, and others, however always remaining within the limits of the following claims.

I claim:

1. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; and power take-off means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft.

2. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; power take-off means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft; and manually operable setting means carried by said support means and operatively engaging said transmission means and take-off means for placing said transmission means in its first or second position, for automatically placing said take-off means in its second position when said transmission means is in its first position, and for automatically placing said take-off means in its first position when said transmission means is in its second position.

3. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; power take-off means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft; and manually operable variable speed drive means operatively connected to said power transmission means for driving the latter at a selected one of a plurality of given speeds.

4. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; power takeoff means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft; a pair of output shafts turnably carried by said support means; and manually operable means for selectively placing either one of said output shafts in driving engagement with said power take-off means.

5. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; power take-off means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft; manually operable variable speed drive means operatively connected to said power transmission means for driving the latter at a selected one of a plurality of given speeds; a pair of output shafts turnably carried by said support means; and manually operable means for selectively placing either one of said output shafts in driving engagement with said power take-off means.

6. In a gear transmission, in combination, support means; a pair of shafts turnably carried by said support means; a plurality of gears of different diameters respectively located beside each other on one of said shafts and fixed to said one shaft for rotation therewith; an additional gear; means mounting said additional gear on said other of said shafts for axial movement therealong and for rotation therewith; manually operable means operatively connected to said additional gear for selectively placing the same in driving cooperation with one of said plurality of gears on said one shaft; power transmission means carried by said support means and having a first position operatively engaging said one shaft for rotating the latter and a second position operatively engaging said other shaft for rotating the latter, so that when said power transmission means is in its first position a drive will be transmitted through said one shaft and one of said plurality of gears to said additional gear and said other shaft and when said transmission means is in its second position power will be transmitted through said other shaft and additional gear to one of said plurality of gears and said one shaft; power take-off means carried by said support means and having a first position operatively engaging said one shaft to receive power therefrom and a second position operatively engaging said other shaft to receive power therefrom, so that when said take-off means is in its first position and said transmission means is in its second position power will be delivered from said one shaft and when said take-off means is in its second position and said transmission means is in its first position power will be delivered from said other shaft; manually operable setting means carried by said support means and operatively engaging said transmission means and take-off means for placing said transmission means in its first or second position, for automatically placing said take-off means in its second position when said transmission means is in its first position, and for automatically placing said take-offff means in its first position when said transmission means is in its second position; manually operable variable speed drive means operatively connected to said power transmission means for driving the latter at a selected one of a plurality of given speeds; a pair of output shafts turnably carried by said support means; and manually operable means for selectively placing either one of said output shafts in driving engagement with said power take-off means.

7. In a gear transmission, in combination, support means; a first pair of parallel shafts turnably carried by said support means; a plurality of gears of different diameters respectively fixed to one of said shafts for turning movement therewith; an additional gear; means mounting said additional gear on the other of said shafts for axial movement therealong and for rotation therewith; manually operable means operatively connected to said additional gear for placing the same in driving cooperation with a selected one of said plurality of gears; a pair of first clutch faces respectively fixed to one of the ends of said shafts; a pair of driving gears respectively fixed to said shafts adjacent the other of the ends thereof; a second pair of shafts respectively coaxial with said first pair of parallel shafts and respectively located next to said one end thereof, said second pair of shafts being turnably carried by said support means; a pair of transmission gears respectively having second clutch faces mating with and directed toward said first clutch faces, respectively; and means mounting said transmission gears respectively on said second pair of shafts for turning movement therewith and for axial movement thereon between one position where said second clutch faces respectively engage said first clutch faces and another position where said transmission gears respectively mesh with said driving gears.

8. In a gear transmission, in combination, support means; a first pair of parallel shafts turnably carried by said support means; a plurality of gears of different diameters respectively fixed to one of said shafts for turning movement therewith; an additional gear; means mounting said additional gear on the other of said shafts for axial movement therealong and for rotation therewith; manually operable means operatively connected to said additional gear for placing the same in driving cooperation with a selected one of said plurality of gears; a pair of first clutch faces respectively fixed to one of the ends of said shafts; a pair of driving gears respectively fixed to said shafts adjacent the other of the ends thereof; a second pair of shafts respectively coaxial with said first pair of parallel shafts and respectively located next to said one end thereof, said second pair of shafts being turnably carried by said support means; a pair of transmission gears respectively having second clutch faces mating with and directed toward said first clutch faces, respectively; means mounting said transmission gears respectively on said second pair of shafts for turning movement therewith and for axial movement thereon between one position where said second clutch faces respectively engage said first clutch faces and another position where said transmission gears respectively mesh with said driving gears; and manually operable setting means carried by said support means and operatively connected to said pair of transmission gears for simultaneously locating the same either in said one position or in said other position.

9. In a gear transmission, in combination, support means; a first shaft turnably carried by said support means; a plurality of gears of different diameters fixed to said first shaft for rotation therewith; a second shaft parallel to said first shaft and also turnably carried by said support means; an additional gear; means mounting said additional gear on said second shaft for axial movement therealong and for rotation therewith; a plate normal to the axis of said second shaft and located beside said additional gear, said plate having a first peripheral portion formed as a gear sector and a second peripheral portion formed with arcuate rack teeth; means connecting said plate to said additional gear for axial movement therewith and for free turning movement about said second shaft; an idler gear turnably carried by said plate, meshing with said additional gear, and capable of meshing with one of said plurality of gears when said plate is turned about said second shaft; turning means carried by said support means and cooperating with said gear sector for turning said plate about said second shaft; and shiftable rack means carried by said support means and meshing with said rack teeth for axially shifting said plate and said additional and idler gears therewith along said shaft, whereby said idler gear may mesh with a selected one of said plurality of gears to place said additional gear in driving cooperation with said selected gear.

10. In a gear transmission, in combination, support means; a first shaft turnably carried by said support means; a plurality of gears of different diameters fixed to said first shaft for rotation therewith; a second shaft parallel to said first shaft and also turnably carried by said support means; an additional gear; means mounting said additional gear on said second shaft for axial movement therealong and for rotation therewith; a plate normal to the axis of said second shaft and located beside said additional gear, said plate having a first peripheral portion formed as a gear sector and a second peripheral portion formed with arcuate rack teeth; means connecting said plate to said additional gear for axial movement therewith and for free turning movement about said second shaft; an idler gear turnably carried by said plate, meshing with said additional gear, and capable of meshing with one of said plurality of gears when said plate is turned about said second shaft; turning means carried by said support means and cooperating with said gear sector for turning said plate about said second shaft; shiftable rack means carried by said support means and meshing with said rack teeth for axially shifting said plate and said additional and idler gears therewith along said shaft, whereby said idler gear may mesh with a selected one of said plurality of gears to place said additional gear in driving cooperation with said selected gear; and a single manually operable actuating means carried by said support means and operatively connected to said turning means and to said rack means for actuating both of said latter means.

11. In a gear transmission, in combination, support means; a rack carried by said support means for longitudinal shifting therealong, said rack having two sets of rack teeth respectively located substantially at right angles to each other; gear means turnably carried by said support means and meshing with one of said sets of rack teeth; a plate having arcuate rack teeth meshing with the other of said sets of rack teeth and having a peripheral portion in the form of a gear sector spaced angularly from said arcuate rack teeth; means carried by said support means and engaging said plate to guide the same for movement along and about an axis parallel to said rack and in which the centers of said arcuate rack teeth and gear sector are located; an elongated shaft parallel with said axis, turnably carried by said support means, and formed in its outer surface with longitudinally extending gear teeth meshing with said gear sector; a first bevel gear fixed to said shaft; a second bevel gear meshing with said first bevel gear and coaxial with a gear of said gear means, said second bevel gear being formed with an axial bore; a rod fixed to said gear and extending freely through said bevel gear; a sleeve through which said rod freely extends coaxial with the latter and fixed to said second bevel gear; manually operable lever means fixed to said sleeve for turning the latter so as to turn said plate about said axis; and manually operable means for selectively placing said lever means in driving engagement with said rod to turn the latter for shifting said rack and plate in a direction parallel to said axis, whereby a gear turnably carried by said plate may be located in a selected position.

12. In a gear transmission, in combination, support means; a pair of parallel feed shafts turnably carried by said support means; variable speed transmission means carried by said support means; manually operable setting means carried by said support means for placing said transmission means in driving engagement with one or the other of said feed shafts, said setting means including a rod turnably carried by said support means for movement between a pair of angular positions when said transmission means is respectively in driving engagement with said feed shafts, and said rod being formed with a row of notches distributed axially along said rod; stop means formed with a bore through which said rod freely passes and carrying a spring pressed pin for engaging said rod in one of said notches thereof when said rod is in one of said angular positions; and means carried by said support means and mounting said stop means for movement parallel to said rod but restraining said stop means against movement about the axis of said rod, whereby when said rod is in said one of its angular positions said notches may be engaged by said pin and when said rod is in the other of said angular positions said notches will be angularly displaced from said pin.

13. In a gear transmission, in combination, support means; a pair of driving gears of different diameters coaxial with each other and turnably carried by said support means; a first shaft parallel to the axis of said driving gears and turnably carried by said support means; two pairs of gears of different diameters spaced laterally from said driving gears, and fixed to said first shaft for rotation therewith; a fourth pair of gears of different diameters located opposite said pair of driving gears for respectively meshing therewith; means mounting said fourth pair of gears for axial movement along and for rotation with said first shaft; a second shaft parallel to said first shaft and turnably carried by said support means; two additional pairs of gears of different diameters respectively located opposite said two pairs of gears fixed to said first shaft for selective meshing therewith; and means mounting said two additional pairs of gears on said second shaft for axial movement therealong and for rotation therewith, whereby said second shaft may be turned at one of eight different speeds.

References Cited in the file of this patent

UNITED STATES PATENTS

| | | |
|---|---|---|
| 1,231,880 | Hagen | July 3, 1917 |
| 1,754,267 | Dellinger | Apr. 15, 1930 |
| 2,548,337 | Barraco | Apr. 10, 1951 |
| 2,561,753 | Potter et al. | July 24, 1951 |
| 2,572,479 | Hoelscher | Oct. 23, 1951 |
| 2,572,759 | Ritter | Oct. 23, 1951 |